(12) United States Patent
Kinoshita et al.

(10) Patent No.: US 7,849,271 B2
(45) Date of Patent: Dec. 7, 2010

(54) SYSTEM AND METHOD FOR INTRUSION PROTECTION OF NETWORK STORAGE

(75) Inventors: Junji Kinoshita, Sunnyvale, CA (US); Nobuyuki Osaki, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 716 days.

(21) Appl. No.: 11/761,239

(22) Filed: Jun. 11, 2007

(65) Prior Publication Data

US 2008/0307171 A1 Dec. 11, 2008

(51) Int. Cl.
*G06F 12/14* (2006.01)

(52) U.S. Cl. .................... 711/152; 711/163; 726/29; 726/30

(58) Field of Classification Search .................... None
See application file for complete search history.

(56) References Cited

U.S. PATENT DOCUMENTS

| | | | |
|---|---|---|---|
| 6,185,661 B1 | 2/2001 | Ofek et al. | |
| 6,799,255 B1 * | 9/2004 | Blumenau et al. | 711/152 |
| 7,130,978 B2 * | 10/2006 | Kamano et al. | 711/163 |
| 7,401,338 B1 * | 7/2008 | Bowen et al. | 719/328 |
| 2007/0033359 A1 * | 2/2007 | Mori et al. | 711/163 |
| 2007/0073698 A1 * | 3/2007 | Kanayama et al. | 707/9 |

OTHER PUBLICATIONS

Hitachi Data Retention Utility, http://www.hds.com/download.html?url=/pdf/ldev_guard_datasheet3.pdf®ion=global&id=526&type=&lang=English&title=Data%20Retention%20Utility. retrieved on Aug. 27, 2008.

Trusted Platform Module (TPM) Specifications, https://www.trustedcomputinggroup.org/specs/TPM, retrieved on Aug. 27, 2008.

* cited by examiner

*Primary Examiner*—Gary J Portka
(74) *Attorney, Agent, or Firm*—Sughrue Mion, PLLC

(57) ABSTRACT

Protection mechanism is provided for data stored in logical volumes, especially during the time the corresponding host computer is off line. Additionally, integrity check mechanism is provided for logical volume when the host computer is started, so that host computer can detect unauthorized access to its assigned logical volume during off-line period, and execute security check.

14 Claims, 15 Drawing Sheets

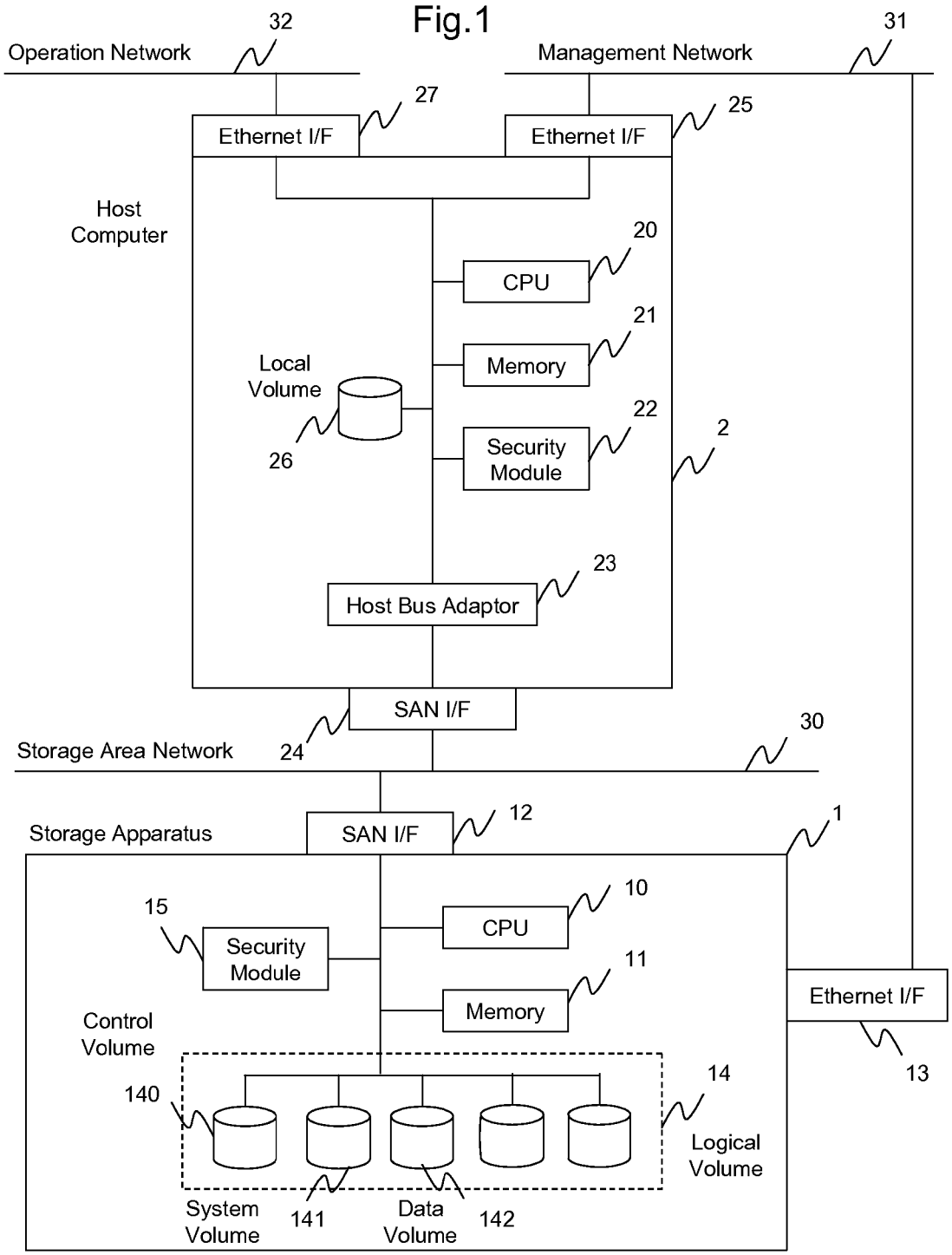

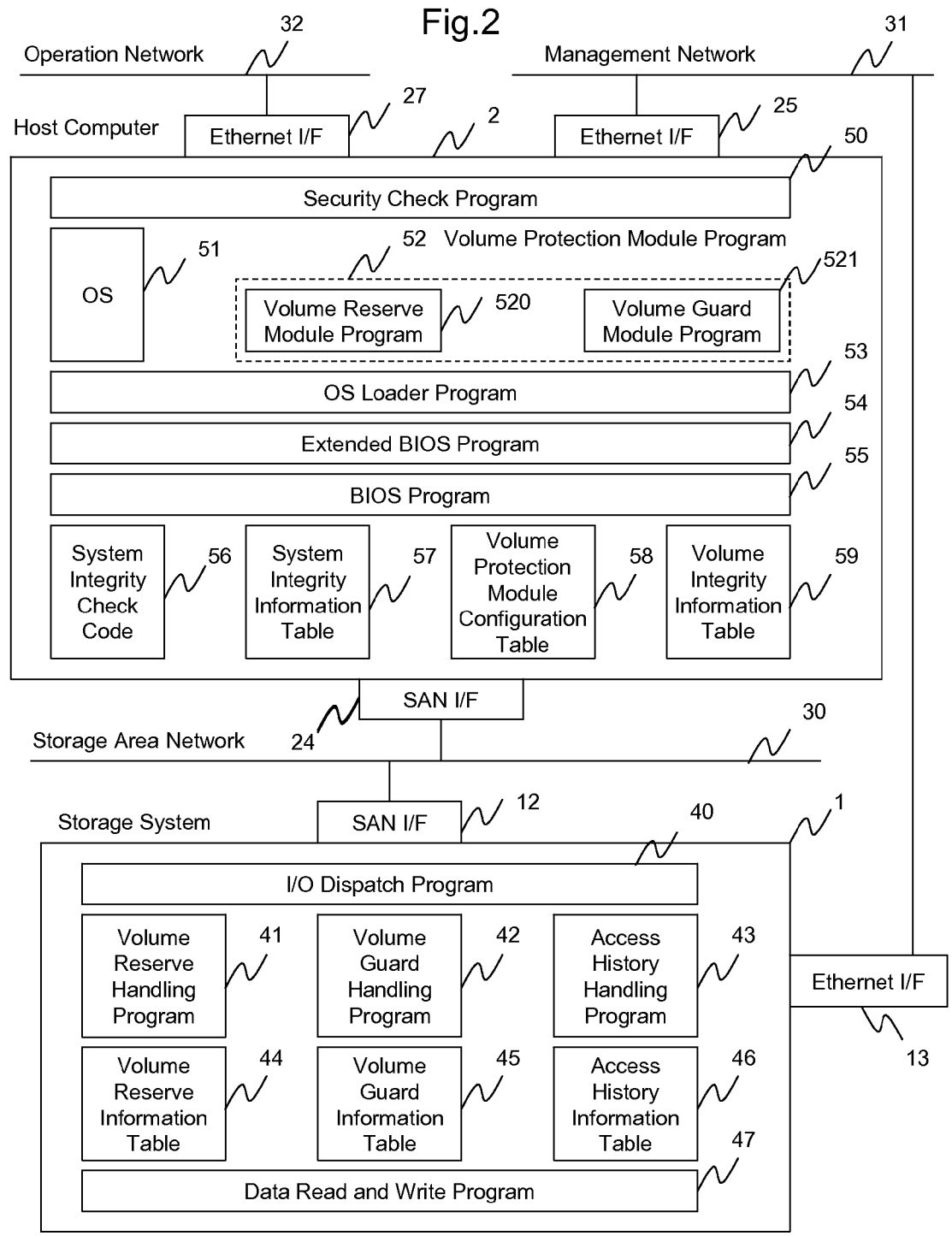

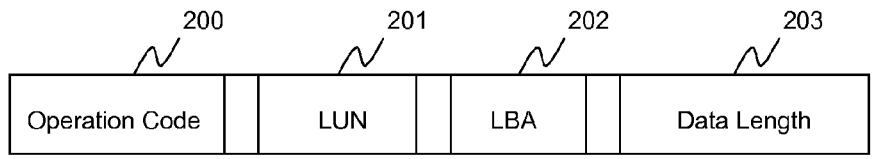

(a) SCSI Command Unit (from Host to Storage)    Fig.3A

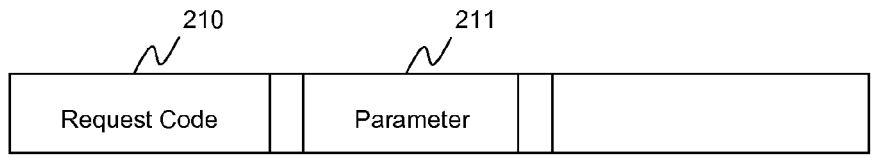

(b) SCSI Write Data (from Host to Storage)    Fig.3B

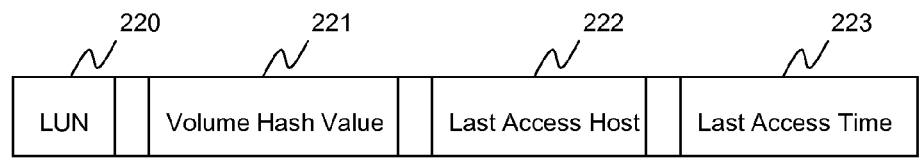

(c) SCSI Read Data (from Storage to Host)    Fig.3C

| System Components | Last Hash Value | Current Hash Value |
|---|---|---|
| BIOS Software | aaaaaa | aaaaaa |
| Extended BIOS Program | bbbbbb | bbbbbb |
| OS Loader Program | cccccc | cccccc |
| OS | dddddd | eeeeee |
|  |  |  |

Fig.4

| LUN | Last Access Host for Host | Last Access Host for Storage | Last Access Time for Host | Last Access Time for Storage | Last Hash for Host | Last Hash for Storage |
|---|---|---|---|---|---|---|
| 00002 | aa:bb:cc:dd:ee:ff:gg:hh | aa:bb:cc:dd:ee:ff:gg:hh | yyyy-mm-dd-hh-mm-ss | yyyy-mm-dd-hh-mm-ss | aaaaaa | aaaaaa |
| 00007 | aa:bb:cc:dd:ee:ff:gg:hh | ii:jj:kk:ll:mm:nn:oo:pp | yyyy-mm-dd-hh-mm-ss | yyyy-mm-dd-hh-mm-ss | bbbbbb | cccccc |
|  |  |  |  |  |  |  |

Fig.5

Process to shut down Host Computer

Fig.12
Process to lock Logical Volume
(a) Volume Reserve Case
(b) Volume Guard Case
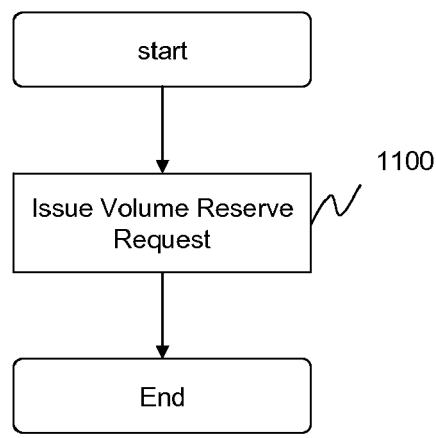
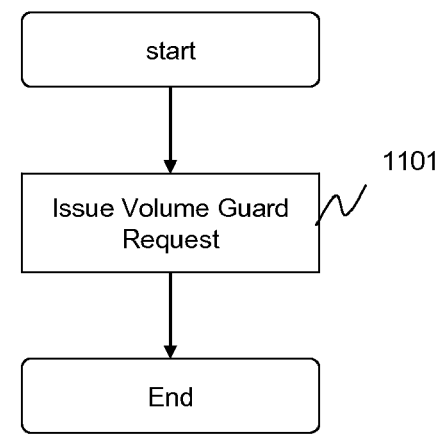

Process to start Host Computer using "SAN-Boot"

Process to start Host Computer using "Non SAN-Boot"

Process to unlock Logical Volume (a) Volume Reserve Case  (b) Volume Guard Case

Process to check integrity of Logical Volume

Process to check system security

Process to dispatch I/O

Process to handle Volume Reserve

Process to handle Volume Guard

Process to handle Access History Information request

SYSTEM AND METHOD FOR INTRUSION PROTECTION OF NETWORK STORAGE

FIELD OF THE INVENTION

The present invention relates to protection of data stored in storage system.

DESCRIPTION OF THE RELATED ART

In general, there are many kinds of security applications to protect stored data. Such applications include, e.g., antivirus software, intrusion detection software, etc. These applications are generally host-based, in that they run on the host computer. Administrators of the host computers can use those security applications to protect their data and check integrity of their data in the logical volumes of the storage system that is connected to the host computer via SAN. However, such solutions are operational only during the time that the host computer is running. In SAN environment, data pools of many host computers are consolidated by the storage system, such that the storage system provides services to several host computers concurrently. In such an environment, each host computer runs its own security application to protect its own assigned volumes. Consequently, when any given host computer is off line, its assigned logical volumes on storage system are exposed to threats. For further information on this subject, the reader is directed to the Trusted Computing Group, a not-for-profit industry-standards organization established with the aim of enhancing the security of the computing environment in disparate computer platforms. Their standards development can be found at https://www.trustedcomputinggroup.org/specs/TPM Another feature of storage systems that is of interest to this invention is volume locking. For example, the subject assignee offers a feature marketed as Hitachi Data Retention Utility, enabling users to lock archived data so as to make the data non-erasable and non-rewritable. More information about assignee's system can be found at:

--- http://www.hds.com/download.html?url=/pdf/
ldev_guard_datasheet3.pdf®ion=global&id=
526&type=&lang=English&title=Data%20Retention%20Utility.

---

Another manner for protecting data from alteration is generally known as WORM (Write Once Read Many times). The WORM feature is disclosed in, for example, U.S. Pat. Nos. 4,689,778; 4,760,566; 4,831,611; 5,023,854; and 6,185,661, the disclosures of all of which is incorporated herein by reference in their entirety.

What is lacking in the art is a technology providing a way to secure data residing on a storage system while the host computer is off line or is shut down.

SUMMARY

The subject invention provides protection mechanism for data stored in logical volumes, especially during the time the corresponding host computer is off line. The subject invention further provides integrity check mechanism for logical volume when the host computer is started, so that host computer can detect unauthorized access to its assigned logical volume during off-line period, and execute security check.

According to an aspect of the invention, a method for protecting data stored in a storage system is provided, comprising the steps:

a. assigning at least one logical volume of the storage system to a host computer;
b. whenever the host computer initiates a procedure to go off line, sending from the host computer instruction to the storage system to lock the assigned logical volume;
c. during a time when the host computer remains off line performing:
   locking the assigned logical volume by refusing any write request to the assigned volume; and,
   storing in the storage system pre-defined access information; and,
d. when the host resumes operation on line, sending the access information to the host.

The method may further comprise the step:
b.i. calculating a host hash value for selected data of the assigned logical volume, and storing the host hash value locally on the host computer.

The logical volume may comprise system information data and user data, and wherein the selected data may comprise user data. Upon receiving an indication that the host resumes operation, the storage system may send a storage hash value to the host, and the host may compare the storage hash value to the host hash value to detect security breach. The access information may comprise last access time and last access host ID. Step b may further comprise storing in the host a host last access time and a host last access host ID. The method may further comprise upon resuming operation by the host, comparing the last access time to the host last access time, and the last access host ID to the host last access host ID to detect security violation. Upon detecting a security violation, the host computer may execute a virus check. In the method, the OS of the host computer may reside in the storage system, and then step d may further comprise:

determining the integrity of the stored OS;
If integrity check is safe, booting the host computer from the stored OS. Upon receiving a write command to a target volume from a host computer, the method may proceed by performing the steps:

determining whether the target volume is guarded and, if so, returning an error message; otherwise:
executing the write command and determining whether the target volume is a user data area and, if so, calculating a hash value of the target volume and updating the pre-defined access information.

According to other aspects of the invention, a storage system is provided having logical units defined therein, at least some of the logical volumes assigned to respective host computers, and comprising:

a storage network area interface;
a controller;
a memory unit;
a plurality of physical storage devices;
and a security module, the security module comprising:
a volume locking module operable to lock volume upon instructions from a host computer;
access history handling module operable to store in the memory unit pre-defined access information;
an access history table having entry fields for logical unit number, hash value, access host ID, and access time.

In the storage system, upon receiving an access history request from the host, the controller may be operable to read access history data from the access history table and send the access history data to the host computer. upon receiving a write request to a target volume from the host, said controller is operable to:

determining whether the target volume is guarded and, if so, returning an error message; otherwise:

executing the write command and determining whether the target volume is a user data area and, if so, calculating a hash value of the target volume and updating the hash value in the access history table. The controller may be operable to update the access host ID, and access time in the access history table.

According to further aspects of the invention, a system enabling protection of data stored in a storage system is provided, comprising:

A host computer coupled to the storage system, the host computer comprising:
 a processor;
 host memory;
 local volume; and
 a host security module, the security module comprising a volume protection module operable to transmit volume lock instructions to lock a storage assigned volume prior to disconnecting the host computer from the storage system; and,
a storage system having logical units defined therein, at least one of the logical volumes comprising the SAN assigned volume, the storage system comprising:
 a storage network area interface;
 a controller;
 a memory unit;
 a plurality of physical storage devices;
 and a storage security module, the security module comprising:
  a volume locking module operable to lock the storage assigned volume upon receiving the volume lock instructions from the host security module;
  access history handling module operable to store in the memory unit pre-defined access information.

In the system, the host computer further comprises volume integrity information table and the storage system further comprises access history information table. The the volume integrity information table comprises entry fields for:
 logical unit number;
 last access host ID for host;
 last access host ID for storage;
 last access time for host;
 last access time for storage;
 last hash value for host; and
 last hash value for storage.

Prior to disconnecting from the storage system, the host computer may refresh the values stored in fields: last access host ID for host; last access time for host; and last hash value for host. Upon resuming connection to the storage system, the host computer obtain values from the storage system for the fields: last access host ID for storage; last access time for storage; and last hash value for storage.

The storage system further comprises access history information table comprising entries for:
 Logical unit number;
 Hash value;
 Access host ID; and
 Access time.

Additional aspects related to the invention will be set forth in part in the description which follows, and in part will be apparent from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically:

FIG. 1 shows an example of physical hardware architecture according to an embodiment of the invention.

FIG. 2 shows an example of logical software architecture according to an embodiment of the invention.

FIG. 3(a) shows an example data structure of SCSI Command Unit.

FIG. 3(b) shows an example data structure of SCSI Write data that is used for operation commands.

FIG. 3(c) shows an example data structure of SCSI Read Data that is used for responds of Access History requests.

FIG. 4 shows an example data structure of System Integrity Information Table 57.

FIG. 5 shows an example data structure of Volume Integrity Information Table 59.

FIG. 12(a) shows an example process to lock a Logical Volume using Volume Reserve Module Program 520.

FIG. 12(b) shows an example process to lock a Logical Volume using Volume Guard Module Program 521.

Figure 6:
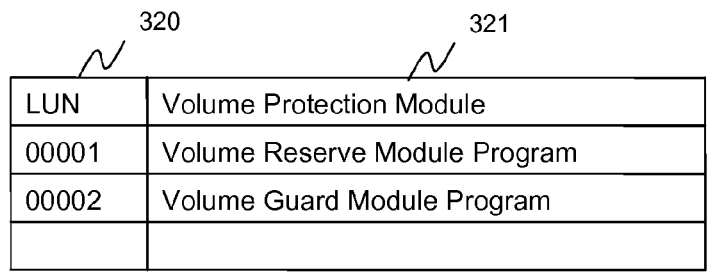
FIG. 6 shows an example data structure of Volume Protection Module Configuration Table 58.

The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of software running on a general purpose computer, in the form of a specialized hardware, or combination of software and hardware.

DETAILED DESCRIPTION

According to features of the invention, methods are provided to secure data stored in logical volumes, especially during the time in which the corresponding host in off line, e.g., shut down. According to the features, when the host computer goes off line, it first locks its logical volumes on storage system, in cooperation with storage system. The administrator of the host computer can select the locking method for each logical volume. The storage system records write access history and integrity of its logical volumes, and sends the information to each host computer when it is required. When the host computer is started, it unlocks its logical volumes on the storage system, and checks the integrity of the logical volumes, in cooperation with storage system. If the host computer finds any violation, it executes security check. The processes to unlock logical volume and check integrity of logical volume are executable even in SAN-Boot environment where Host Computer's OS is stored in logical volume on Storage System. The processes to unlock logical volume and check integrity of logical volume works in coordination with trusted environment with security module such as TPM (Trusted Platform Module).

Hardware Architecture

FIG. 1 shows an example of physical hardware architecture according to an embodiment of the invention. The overall system consists of Storage System 1 and at least one Host Computer 2. Each Host Computer and Storage System are connected through SAN (Storage Area Network) 30 and Management Network 31. Each Host Computer is also connected to Operation Network 32. SAN could be various types of networks like FC (Fibre Channel) or IP (Internet Protocol).

The storage system is comprised of at least one CPU 10, at least one Memory 11, at least one SAN interface 12 that is used for connecting to SAN 30 and at least one Ethernet interface 13 that is used for connecting Management Network 31. It also has one or more Logical Volumes 14. Each Logical Volume is composed of a plurality of physical storage mediums that could be various types of devices such as hard disks, flash memories, optical disk, tapes, and so on. Host Computers identify Logical Volumes using LUN (Logical Unit Number). In addition, Storage System might include Security Module 15.

The Logical Volumes include at least one Control Volume 140. Host Computers can use Control Volume for the purpose of issuing various kinds of operation commands to Storage System. Such kind of operation command and result of the command are transferred between Host Computer and Storage System using SCSI Read and SCSI Write. The Logical Volumes might include System Volume 141. It is one of Logical Volumes that is used for the purpose of storing OS of Host Computer. In such case, when Host Computer is started, Host Computer can boot up OS on System Volume. Such a case is referred to herein as "SAN-Boot." The Logical Volumes include at least one Data Volume 142 that is used for the purpose of storing various kinds of data. The Security Module 15 is used for executing cryptographic operation securely, storing secret information securely, and other purposes. In general, Security Module is known as TPM (Trusted Platform Module).

The Host Computer 2 is comprised of at least one CPU 20, at least one Memory 21, at least one Host Bus Adaptor 23, at least one SAN interface 24, at least two Ethernet interface 25 and 27 and at least one Local Volume 26. In addition, Host Computer might include Security Module 22. It is connected to Storage Area Network 30 via SAN I/F 24 and Management Network 31 via Ethernet I/F 25 and Operation Network 32 via Ethernet I/F 27. The OS of Host Computer might be stored in Local Volume 26. In such case, when Host Computer is started, Host Computer can boot up OS on Local Volume. Such a configuration is referred to herein as "Non SAN-Boot."

Logical Architecture

FIG. 2 shows an example of logical software architecture according to an embodiment of the invention. The following is a description of the logical architecture of the storage system, according to the embodiment of FIG. 2.

The I/O Dispatch Program 40 receives various types of requests from Host Computer and sends responses to Host Computer. It invokes another programs or subroutines according to the requests. The Volume Reserve Handling Program 41 is invoked by I/O Dispatch Program 40 to deal with a Volume Reserve request from Host Computer. When a Host Computer is shut down, it needs to lock a Logical Volume so that another Host Computer cannot read/write data from/to the Volume. In such a case, the Host Computer can issue a Volume Reserve request to Storage System using SCSI Reserve command. Volume Reserve Handling Program records LUN of the Logical Volume and the Host Computer's identification to Volume Reserve Information Table 44 so that Data Read and Write Program 47 doesn't accept read/write requests for the Logical Volume from another Host Computer. The Volume Reserve Information Table 44 holds LUNs of Volumes that were required to be reserved by the Host Computer, and identifications of Host Computers that issued Volume Reserve requests to Storage System. This table could be stored in Memory. If Storage System includes Security Module, this table could be stored in Security Module.

Volume Guard Handling Program 42 is invoked by I/O Dispatch Program 40 to deal with a Volume Guard request from Host Computer. When a Host Computer is shut down, it needs to lock a Logical Volume so that another Host Computer cannot write data to the Logical Volume. In such a case, the Host Computer can issue a Volume Guard request to Storage System using an operation command for Control Volume. The Host Computer can also issue a Volume Guard request via Management Network. Volume Guard Handling Program records LUN of the Logical Volume and the Host Computer's identification to Volume Guard Information Table 45 so that Data Read and Write Program 47 doesn't accept write requests for the Logical Volume from another Host Computer. The Volume Guard Information Table 45 holds LUNs of Volumes that were required to be guarded by Host Computer and identifications of Host Computers that issued Volume Guard requests to Storage System. This table could be stored in Memory. If Storage System includes Security Module, this table could be stored in Security Module.

The Access History Handling Program 43 is invoked by I/O Dispatch Program 40 to deal with an Access History request from Host Computer. When a Host Computer is started, it needs to check whether unauthorized access to the Logical Volume occurred or not during the period that the Host Computer has been shut down or off line. In such a case, the Host Computer can issue an Access History request to Storage System using an operation command. Host Computer can also issue an Access History request via Management Network. Access History Handling Program retrieves Access History Information of the Logical Volume from the Access History Information Table, and sends it to the Host Computer. The Access History Information Table 46 holds Access History Information (for example, last access time, last access Host Computers' identification, etc.) for each Logical Volume. Data Read and Write Program updates the table when it receive a write request for a Logical Volume from a Host Computer and writes data to the User Data Area 402 of Logical Volume. Access History Handling Program refers to the table when it receives Access History requests from Host Computers as mentioned above. This table could be stored in Memory. If Storage System includes Security Module, this table could be stored in Security Module. The Data Read and Write Program 47 is invoked by I/O Dispatch Program to deal with SCSI Read and SCSI Write requests from Host Computers. When a Host Computer reads data from a Logical Volume, it issues a SCSI Read command to Storage System. When a Host Computer writes data to a Logical Volume, it issues a SCSI Write command to Storage System.

The following is a description of the logical architecture of the host computer, according to the embodiment of FIG. 2.

The System Integrity Check Code 56 is a code that is executed when the Host Computer is started. It could be CRTM (Core Root of Trust Measurement) within the TCG (Trusted Computing Group) specification and implemented as a boot block of BIOS. It calculates a hash value of BIOS Program 55 and stores it into System Integrity Information Table 57 via Security Module 22 to check integrity of BIOS Program 55. The BIOS Program 55 is a firmware of the Host Computer. In general, it provides interfaces for controls of peripherals to software, and boot up operating system. When a Host Computer includes Security Module 22, as in this embodiment, it could also calculate a hash value of Extended BIOS Program 54 or OS Loader Program 53 and stores it into System Integrity Information Table 57 via Security Module 22. In "SAN-Boot" case, BIOS Program calculates a hash value of Extended BIOS Program and runs Extended BIOS Program. In "Non SAN-Boot" case, BIOS Program calculates a hash value of OS Loader Program and runs OS Loader Program.

The Extended BIOS Program 54 is a firmware of Host Bus Adaptor 23 and used in "SAN-Boot" case. It provides interfaces for controls of Storage System. When a Host Computer is started, it unlocks a System Volume according to a volume locking method defined within Volume Protection Module Configuration Table 58. In addition, it issues an Access History request to Storage System, receives Access History information for the System Volume, and stores it into Volume Integrity Information Table 59. When a Host Computer includes Security Module 22, as in this embodiment, it could also calculate a hash value of OS Loader Program 53 and stores it into System Integrity Information Table 57 via Security Module 22. Finally, it runs OS Loader Program 53.

The OS Loader Program 53 is a software used to boot up OS 51. In "SAN-Boot" case, it is stored in a System Volume on Storage System. In "Non SAN-Boot" case, it is stored in a Local Volume on the Host Computer. When a Host Computer includes Security Module 22, as in this embodiment, it could also calculate a hash value of OS 51 and stores it into System Integrity Information Table 57 via Security Module 22, and boot up OS 51. The OS 51 is a software used to provide interfaces of hardware control to application software. In "SAN-Boot" case, it is stored in a System Volume on Storage System. In "Non SAN-Boot" case, it is stored in a Local Volume on the Host Computer. When a Host Computer is started, OS unlocks a Data Volume using Volume Protection Module Program 52 according to a volume locking method defined within Volume Protection Module Configuration Table 58. In addition, it issues an Access History request to Storage System, receives an Access History information for the volume, and stores it into Volume Integrity Information Table 59. When a Host Computer includes Security Module 22, as in this embodiment, it could also calculate a hash value of application software on OS and stores them into System Integrity Information Table 57 via Security Module 22.

The Volume Protection Module Program 52 could be a software module of OS or an application software on OS. An administrator of Host Computer can select any types of volume locking method using Volume Protection Modules. In this embodiment, Volume Reserve Module Program 520 and Volume Guard Module Program 521 are defined. The Volume Reserve Module Program 520 is one of Volume Protection Module Program 52. When a Host Computer is shut down or goes off line, it issues a Volume Reserve request to Storage System to lock a Logical Volume using SCSI Reserve command. When a Host Computer is started, it issues a Volume Release request to Storage System to unlock the Logical Volume using SCSI Release command.

The Volume Guard Module Program 521 is one of Volume Protection Module Program 52. When a Host Computer is shut down, it issues a Volume Guard request to Storage System to lock a Logical Volume using an operation command for Control Volume. It can also issue a Volume Guard request to Storage System via Management Network. When a Host Computer is started, it issues a Volume Guard Cancel request to Storage System to unlock the Logical Volume using an operation command for Control Volume. It can also issue a Volume Guard Cancel request to Storage System via Management Network.

Security Check Program 50 could be a software module of OS or an application software on OS. When a Host Computer includes Security Module like this embodiment, it could refer to a System Integrity Information Table 57 via Security Module and check hash values to detect unauthorized modification of software. In this embodiment, it refers to also Volume Integrity Information Table 59 to detect unauthorized modification of volume data and perform some kind of security check (for example, virus check). System Integrity Information Table 57 is stored in Security Module. It holds hash values of software (for example, BIOS Program, Extended BIOS Program, OS Loader Program, OS, etc). Volume Protection Module Configuration Table 58 could be stored in Security Module 22. An administrator of a Host Computer can choose a volume locking method for each Logical Volume using this table. In this embodiment, Volume Reserve and Volume Guard can be selected. Volume Integrity Information Table 59 could be stored in Security Module 22. It holds Access History information for each Logical volume in the viewpoint of both Host Computer and Storage System. Access History information includes Host Computer's identification that accessed to the volume last time, last access time, and hash value of Logical Volume.

Data Structure

The following is a description of SCSI Command Unit according to an embodiment of the invention. The Host Computer and Storage System communicate with each other using SCSI protocol via SAN. Host Computers issues requests using SCSI Command Unit, and then Host Computers could transmit data to Storage System or receive data from Storage System. FIG. 3(a) shows an example data structure of SCSI Command Unit. Operation Code 200 indicates a type of request (for example, Read, Write, Reserve, Release, etc.). LUN 201 indicates a target volume LUN of the request. LBA 202 indicates an address within the target volume. Data Length 203 indicates data length that transferred between a Host Computer and a Storage System after SCSI Command Unit.

When Host Computers write data to Logical Volumes on Storage System, Host Computers issues SCSI Write command to Storage System, and then transmit data to Storage System. In this embodiment, Host Computers can also issue another operation commands that are not defined in SCSI protocol using SCSI Write data. FIG. 3(b) shows an example data structure of SCSI Write data that is used for operation commands. Request Code 210 indicates a type of request of the command (for example, Volume Guard, Volume Guard Cancel, Access History, etc). Parameter 211 holds a parameter data of the request. When a Host Computer issues Volume Guard request, Volume Guard Cancel request, and Access History request, it holds a LUN of a Logical Volume.

When Host Computers read data from Logical Volumes on Storage System, Host Computers issues SCSI Read command to Storage System, and then receive data from Storage System. In this embodiment, Host Computers can also receive responds of operation commands that are not defined in SCSI protocol using SCSI Read data. FIG. 3(c) shows an example data structure of SCSI Read Data that is used for responds of Access History requests. LUN 220 holds LUN of Logical Volume. Volume Hash Value 221 holds hash value of the Logical Volume that was calculated by Storage System. Last Access Host 222 holds identification of Host Computer that accessed to the Logical Volume last time. Last Access Time 223 holds last access time.

FIG. 4 shows an example data structure of System Integrity Information Table 57. System Components 300 indicates names of firmware or software on a Host Computer. Last Hash Value 301 indicates hash values of System Components that had been calculated at previous boot process of the Host Computer. Current Hash Value 302 indicates hash values of System Components that have been calculated at current boot process of the Host Computer.

FIG. 5 shows an example data structure of Volume Integrity Information Table 59. LUN 310 indicates a LUN of a Logical Volume. Last Access Host for Host 311 indicates an identification of a Host Computer that accessed to the Logical Volume last time in the viewpoint of Host Computer. WWN (World Wide Name) might be used as identification of Host Computer. Last Access Host for Storage 312 indicates an identification of a Host Computer that accessed to the Logical Volume last time in the viewpoint of Storage System. WWN (World Wide Name) might be used as identification of Host Computer. Last Access Time for Host 313 indicates last access time when the Host Computer accessed to the Logical Volume in the viewpoint of Host Computer. Last Access Time for Storage 314 indicates last access time when the Host Computer accessed to the Logical Volume in the viewpoint of Storage System. Last Hash for Host 315 indicates hash value of the Logical Volume that was calculated by Host Computer after last access to the Logical Volume. Last Hash for Storage 316 indicates hash value of the Logical Volume that was calculated by Storage System after last access to the Logical Volume.

FIG. 6 shows an example data structure of Volume Protection Module Configuration Table 58. LUN 320 indicates a LUN of a Logical Volume that could be locked or unlocked. Volume Protection Module 321 indicates the name of Volume Protection Module that is used for locking or unlocking the Logical Volume. There could be various types of methods including Volume Reserve and Volume Guard.

Figure 7:
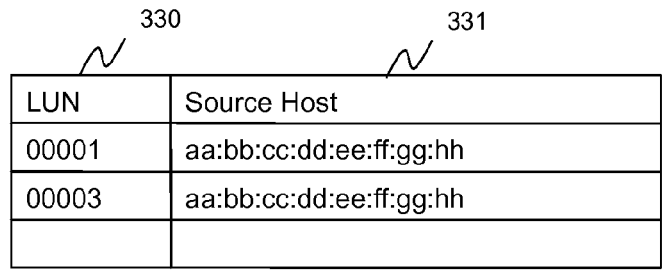
FIG. 7 shows an example data structure of Volume Reserve Information Table 44.
Figure 8:
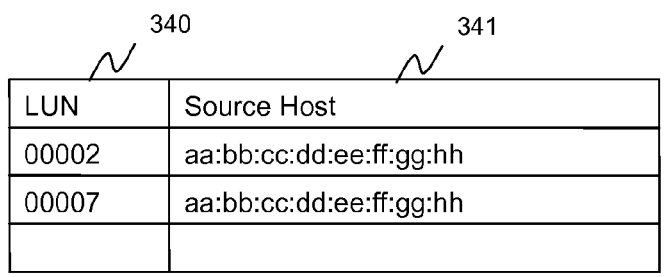
FIG. 8 shows an example data structure of Volume Guard Information Table 45.

FIG. 7 shows an example data structure of Volume Reserve Information Table 44. LUN 330 indicates a LUN of a Logical Volume that has been locked by a Host Computer. Source Host 331 indicates an identification of the Host Computer that has locked the Logical Volume using a Volume Reserve request. FIG. 8 shows an example data structure of Volume Guard Information Table 45. LUN 340 indicates a LUN of a Logical Volume that has been locked by a Host Computer. Source Host 341 indicates an identification of the Host Computer that has locked the Logical Volume using a Volume Guard request.

Figure 9:
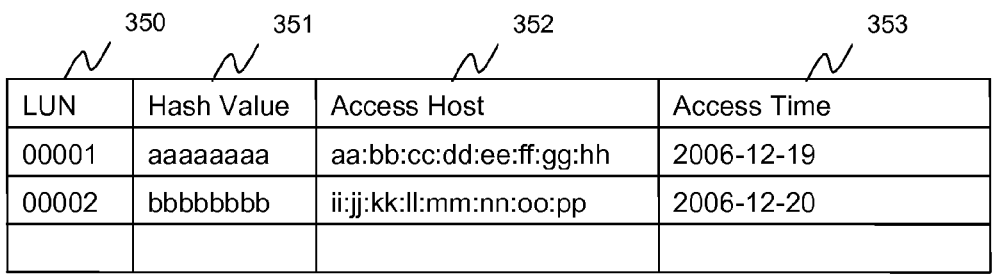
FIG. 9 shows an example data structure of Access History Information Table 46.

FIG. 9 shows an example data structure of Access History Information Table 46. LUN 350 indicates a LUN of a Logical Volume. Hash Value 351 indicates a hash value of the Logical Volume that is calculated by Data Read and Write Program after SCSI Write to the User Data Area 402 of Logical Volume has occurred. Access Host 352 indicates an identification of a Host Computer that accessed to the Logical Volume last time. Access Time 353 indicates last access time when the Host Computer accessed to the Logical Volume.

Figure 10:
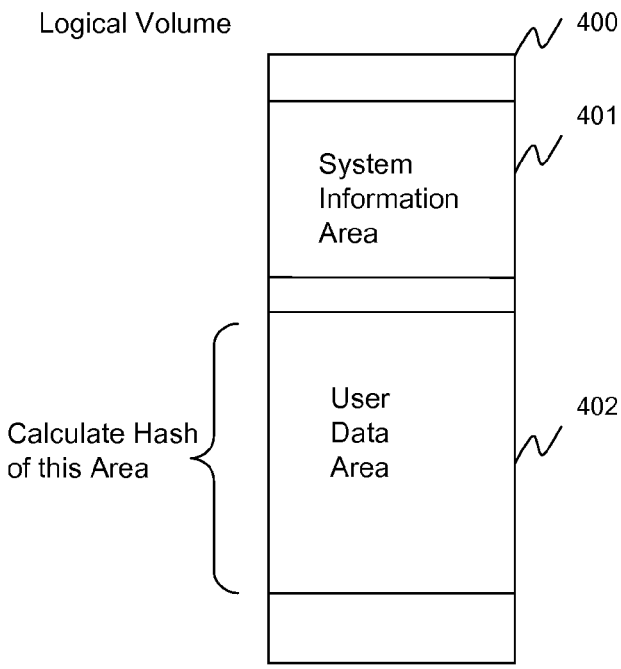
FIG. 10 shows an example data structure of address space of Logical Volume.

FIG. 10 shows an example data structure of address space of Logical Volume. System Information Area 401 indicates an area that is mainly used by Filesystem of Host Computer and Storage System. System Information Area 401 doesn't contain important user data that should be protected. On the other hand, User Data Area 402 indicates an area that is mainly used by application software on OS to store user data that should be protected. When Host Computers and Storage System calculate hash values of a Logical Volume in this embodiment, they calculate hash values of user data area 402. As can be understood, the data in system information area can be changed by access of another host. However, if there is no change in the data that is stored in the user data area, then there can be said that there is no violation. Therefore, in this embodiment, hash value is calculated only for the user data area 402.

Process Flow

Figure 11:
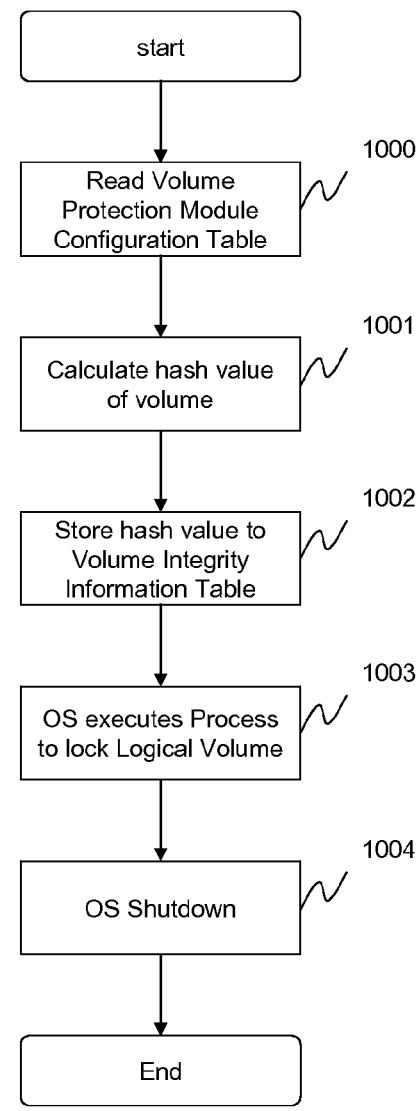
FIG. 11 shows an example process to shut down Host Computer.

The following is a description of various processes executed according to embodiments of the invention. FIG. 11 shows an example process to shut down Host Computer. Step 1000: OS reads Volume Protection Module Configuration Table 58. Step 1001: OS calculates a hash value of each Logical Volume. Step 1002: OS stores hash values in Volume Integrity Information Table 59. Step 1003: OS executes Process to lock Logical Volume using a Volume Protect Module Program that defined within Volume Protection Module Configuration Table 58. Step 1004: Host Computer is shut down.

FIG. 12(a) shows an example process to lock a Logical Volume using Volume Reserve Module Program 520. Step 1100: OS issues Volume Reserve request for the Logical Volume on Storage System sending SCSI Reserve command to Storage System. FIG. 12(b) shows an example process to lock a Logical Volume using Volume Guard Module Program 521. Step 1101: OS issues Volume Guard request for the Logical Volume on Storage System sending operation command to Storage System. OS can also send Volume Guard request to Storage System via Management Network.

Figure 13:
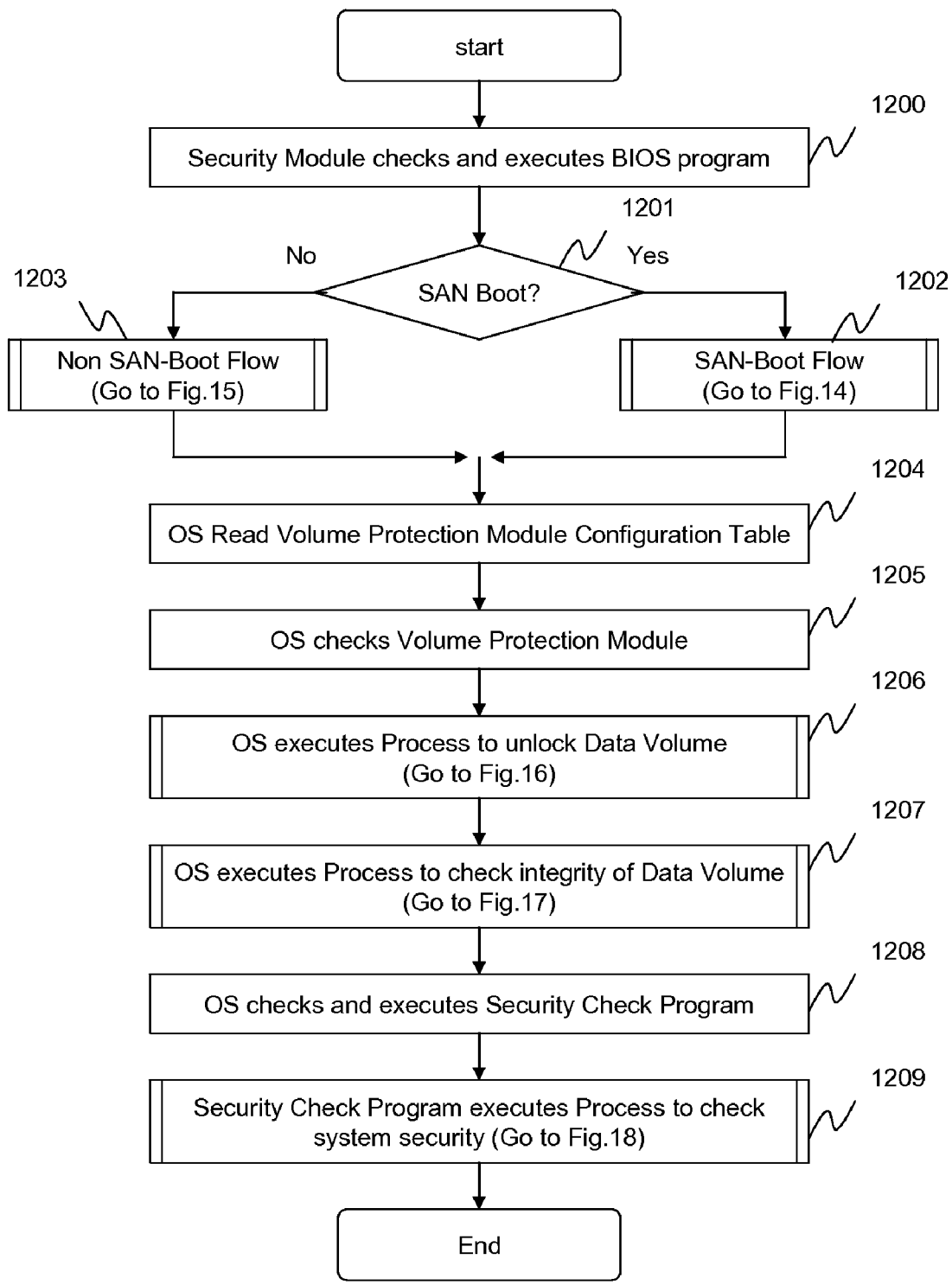
FIG. 13 shows an example process to start Host Computer.

FIG. 13 shows an example process to start Host Computer. Step 1200: System Integrity Check Code 56 calculates a hash value of BIOS Program 55, stores it in System Integrity Information Table 57, and executes BIOS Program 55. Step 1201: If the Host Computer starts using "SAN-Boot" then proceed to Step 1202 otherwise proceed to Step 1202. Step 1202: Process to start Host Computer using "SAN-Boot" is executed. Step 1203: Process to start Host Computer using "Non SAN-Boot" is executed. Step 1204: OS reads Volume Protection Module Configuration Table 58. Step 1205: OS calculates a hash value of Volume Protection Module Program 52, stores it in System Integrity Information Table 57. Step 1206: OS executes Process to unlock the Logical Volume for a Data Volume using a Volume Protect Module Program that defined within Volume Protection Module Configuration Table 58. Step 1207: OS executes Process to check integrity of Logical Volume for the Data Volume. Step 1208: OS calculates a hash value of Security Check Program 50, stores it in System Integrity Information Table 57, and executes Security Check Program 50. Step 1209: Security Check Program 50 executes Process to check system security.

Figure 14:
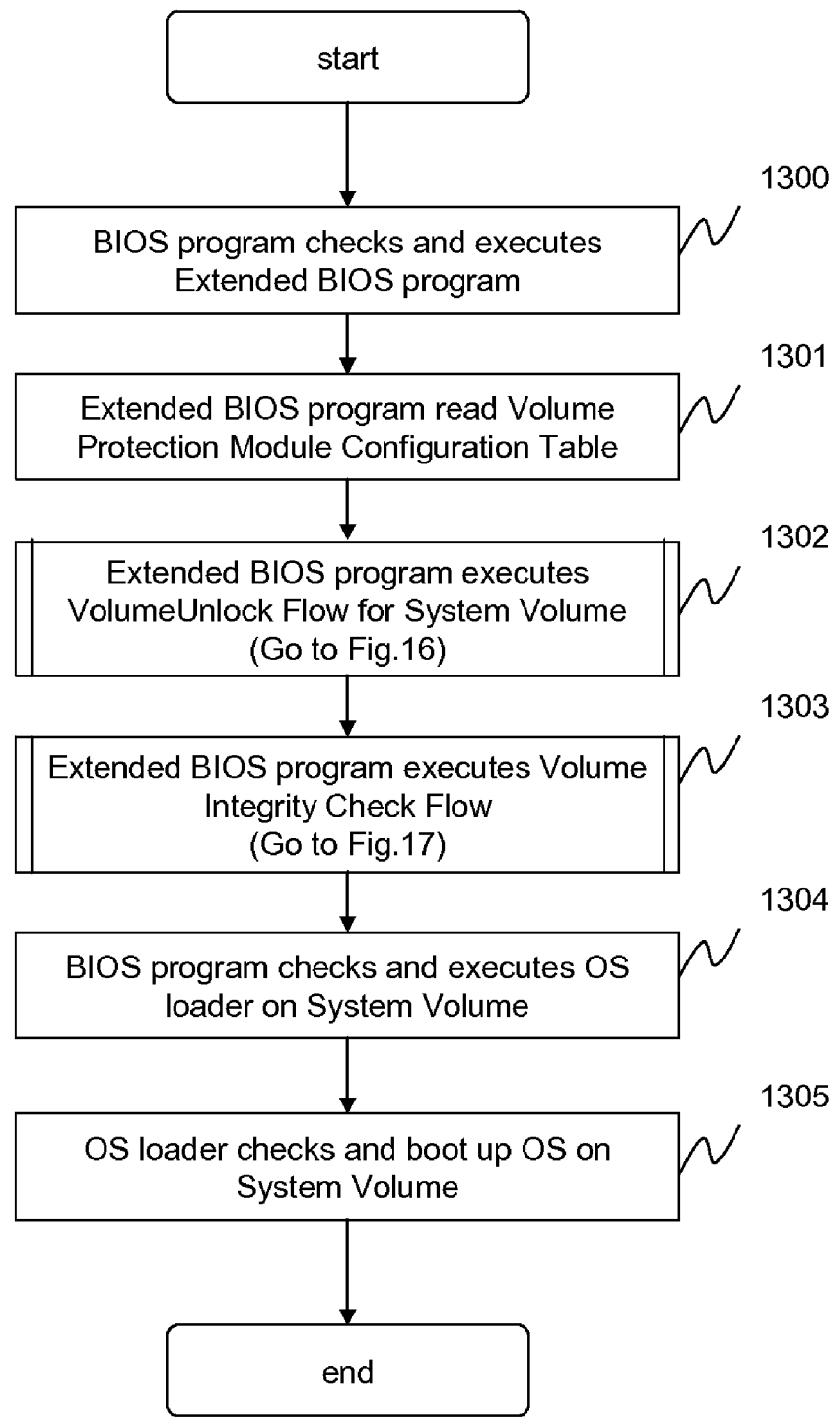
FIG. 14 shows an example process to boot up Host Computer using "SAN-Boot".

FIG. 14 shows an example process to boot up Host Computer using "SAN-Boot". Step 1300: BIOS Program 55 calculates a hash value of Extended BIOS Program 54, stores it in System Integrity Information Table 57 and executes Extended BIOS Program 54. Step 1301: Extended BIOS Program 54 reads Volume Protection Module Configuration Table 58. Step 1302: Extended BIOS Program 54 executes Process to unlock Logical Volume for a System Volume using a Volume Protect Module Program that defined within Volume Protection Module Configuration Table 58. Step 1303: Extended BIOS Program 54 executes Process to check integrity of Logical Volume for the System Volume. Step 1304: BIOS Program 55 calculates a hash value of OS Loader Program 53 on the System Volume, stores it in System Integrity Information Table 57, and executes OS Loader Program 53. Step 1305: OS Loader Program 53 calculates a hash value of OS 51 on the System Volume, stores it in System Integrity Information Table 57, and boot up OS 51.

Figure 15:
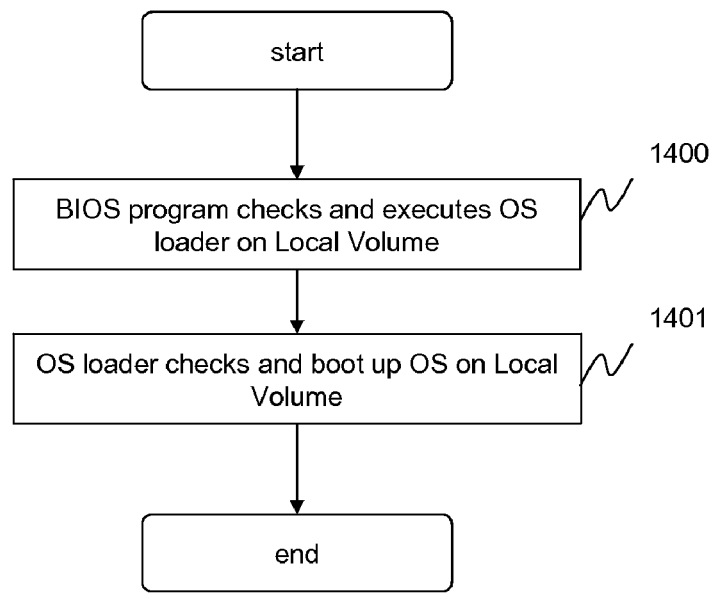
FIG. 15 shows an example process to boot up Host Computer using "Non SAN-Boot".

FIG. 15 shows an example process to boot up Host Computer using "Non SAN-Boot". Step 1400: BIOS Program 55 calculates a hash value of OS Loader Program 53 on Local Volume, stores it in System Integrity Information Table 57, and execute OS Loader Program 53. Step 1401: OS Loader Program 53 calculates a hash value of OS 51 on System Volume, stores it in System Integrity Information Table 57, and boot up OS 51.

Figure 16:
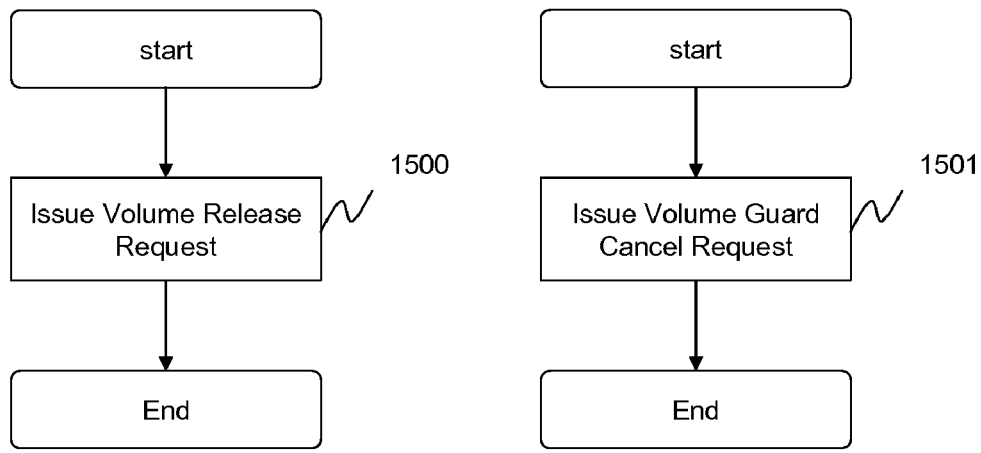
FIG. 16(a) shows an example process to unlock a Logical Volume using Volume Reserve method.
FIG. 16(b) shows an example process to lock a Logical Volume using Volume Guard method.

FIG. 16(a) shows an example process to unlock a Logical Volume using Volume Reserve method. Step 1500: Extended BIOS Program 54 or OS 51 issues Volume Release request for the Logical Volume on Storage System sending SCSI Release command to Storage System. FIG. 16(b) shows an example process to lock a Logical Volume using Volume Guard method. Step 1501: Extended BIOS Program 54 or OS 51 issues Volume Guard Cancel request for the Logical Volume on Storage System sending operation command to Storage System. OS 51 can also send Volume Guard Cancel request to Storage System via Management Network.

Figure 17:
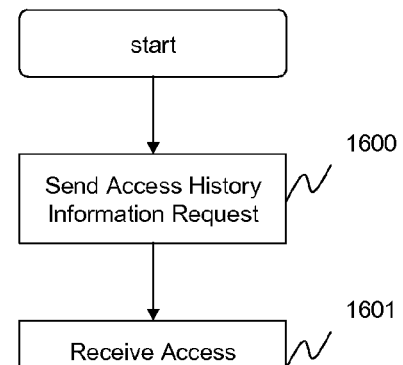
FIG. 17 shows an example process to check integrity of Logical Volume.

FIG. 17 shows an example process to check integrity of Logical Volume. Step 1600: Extended BIOS Program 54 or OS 51 issues Access History Information request for the Logical Volume on Storage System sending operation command to Storage System. OS 51 can also send Access History Information request to Storage System via Management Network. Step 1601: Extended BIOS Program 54 or OS 51 receives Access History Information of the Logical Volume from Storage System. Step 1602: Extended BIOS Program 54 or OS 51 records Access History Information to Volume Integrity Information Table 59.

Figure 18:
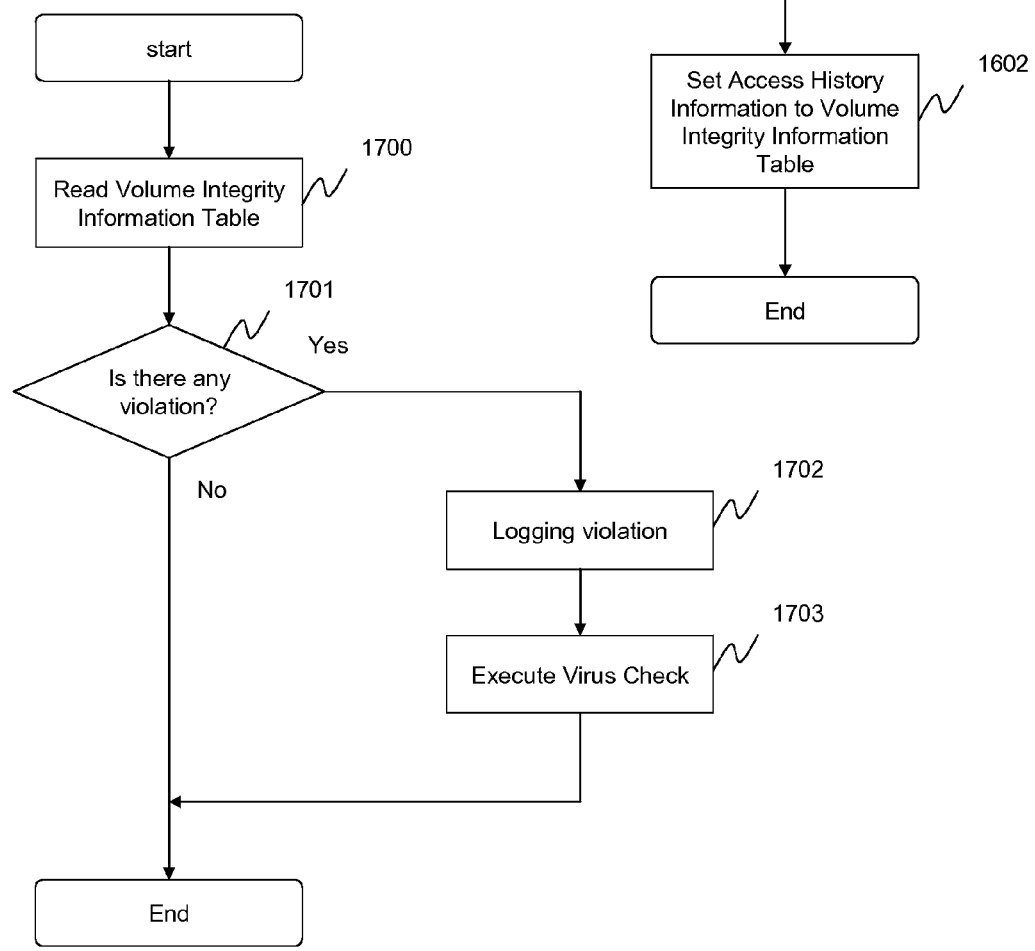
FIG. 18 shows an example process to check system security status.

FIG. 18 shows an example process to check system security status. Step 1700: Security Check Program 50 reads Volume Integrity Information Table 59. Step 1701: Security Check Program checks whether there is any violation or not comparing Last Access Host for Host 311 with Last Access Host for Storage 312, Last Access Time for Host 313 with Last Access Time for Storage 314, Last Hash for Host 315 with Last Hash for Storage 316 for each Logical Volume. If there is any violation, then proceed to Step 1702; otherwise end the process. Step 1702: Security Check Program records details about violation to logs. Step 1703: Security Check Program executes some kind of security check like virus check for the Logical Volume.

Figure 19:
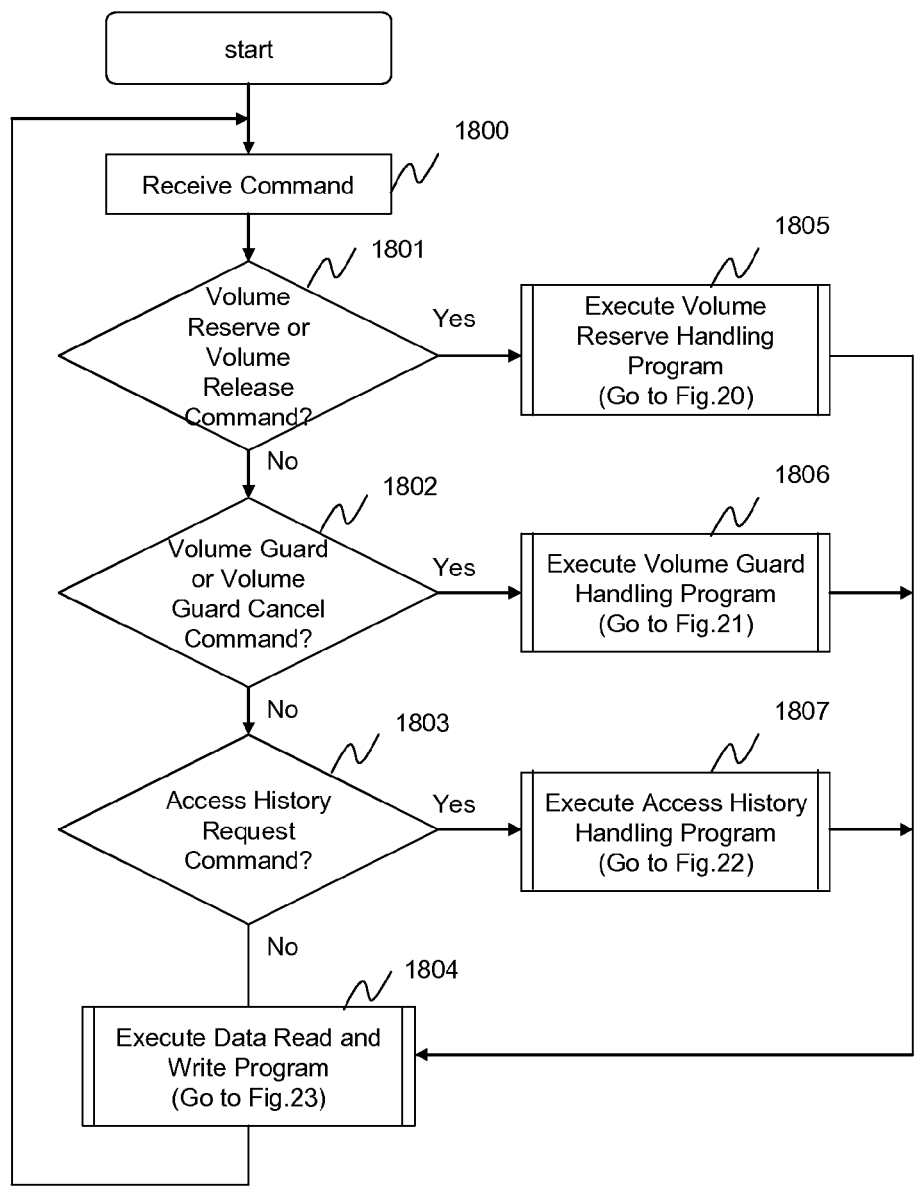
FIG. 19 shows an example process to dispatch I/O executed by I/O Dispatch Program 40.

FIG. 19 shows an example process to dispatch I/O executed by I/O Dispatch Program 40. Step 1800: I/O Dispatch Program receives SCSI Command Unit or operation command. Operation commands are transferred from Host Computer to Storage System using SCSI Write or SCSI Read command for Control Volume. Operation commands are also received via Management Network. Step 1801: I/O Dispatch Program checks whether it is a Volume Reserve command or a Volume Release command. If it is a Volume Reserve command or a Volume Release command then proceed to Step 1805 otherwise proceed to Step 1802. Step 1802: I/O Dispatch Program checks whether it is a Volume Guard request or Volume Guard Cancel request. If it is a Volume Guard request or Volume Guard Cancel request then proceed to Step 1806 otherwise proceed to Step 1803. Step 1803: I/O Dispatch Program checks whether it is an Access History Information request or not. If it is an Access History request then proceed to Step 1807 otherwise proceed to Step 1804. Step 1804: I/O Dispatch Program invokes Data Read and Write Program 47 and Data Read and Write Program 47 executes Process to handle read and write command. Step 1805: I/O Dispatch Program invokes Volume Reserve Handling Program 41 and Volume Reserve Handling Program 41 executes Process to handle Volume Reserve. Step 1806: I/O Dispatch Program invokes Volume Guard Handling Program 42 and Volume Guard Handling Program 42 executes Process to handle Volume Guard. Step 1807: I/O Dispatch Program invokes Access History Handling Program 43 and Access History Handling Program 43 executes Process to handle Access History Information request.

Figure 20:
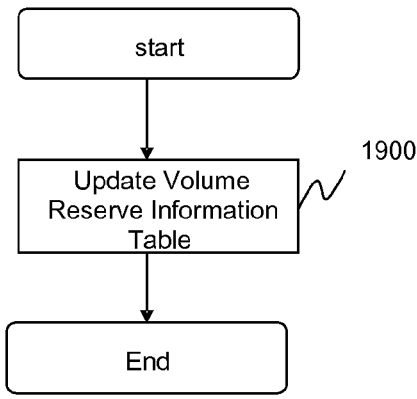
FIG. 20 shows an example process to handle Volume Reserve command or Volume Release command.

FIG. 20 shows an example process to handle Volume Reserve command or Volume Release command. Step 1900: Volume Reserve Handling Program 41 updates Volume Reserve Information Table 44. If Volume Reserve Handling Program 41 receives Volume Reserve command, it adds a record to Volume Reserve Information Table 44 storing LUN and identification of Host Computer that issued command. If Volume Reserve Handling Program 41 receives Volume Release command, it finds a record and deletes it from Volume Reserve Information Table 44.

Figure 21:
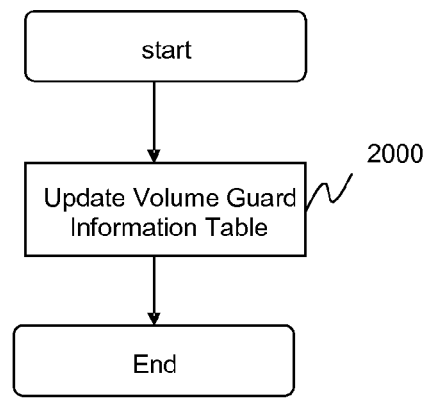
FIG. 21 shows an example process to handle Volume Guard request or Volume Guard Cancel request.
Figure 22:
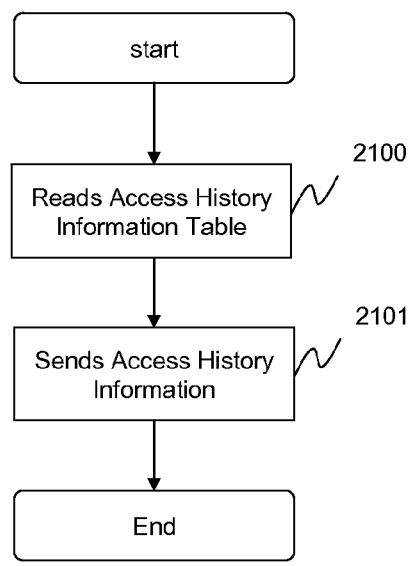
FIG. 22 shows an example process to handle Access History Information request.

FIG. 21 shows an example process to handle Volume Guard request or Volume Guard Cancel request. Step 2000: Volume Guard Handling Program 42 updates Volume Guard Information Table 45. If Volume Guard Handling Program 42 receives Volume Guard request, it adds a record to Volume Guard Information Table 45 storing LUN and identification of Host Computer that issued request. If Volume Guard Handling Program 42 receives Volume Guard Cancel request, it finds a record and deletes it from Volume Guard Information Table 45. FIG. 22 shows an example process to handle Access History Information request. Step 2100: Access History Handling Program 43 reads Access History Information Table 46.

Step 2101: Access History Handling Program 43 sends Access History Information for the logical volume to the Host Computer.

Figure 23:
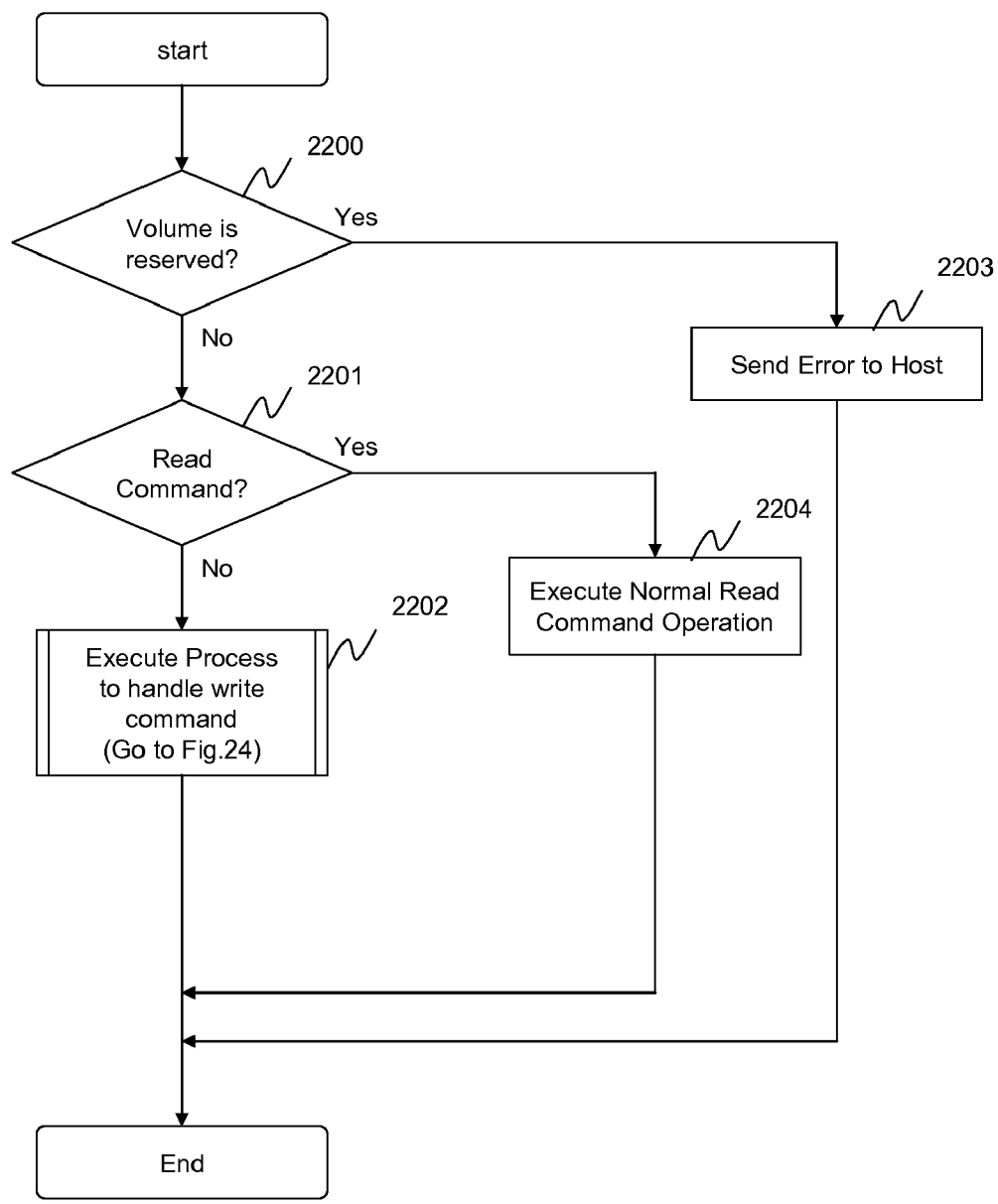
FIG. 23 shows an example process to handle read and write command.

FIG. 23 shows an example process to handle read and write command. Step 2200: Data Read and Write Program 47 checks whether the request is issued for the reserved volume or not using Volume Reserve Information Table 44. If it is issued for the reserved volume then proceed to Step 2203 otherwise proceed to Step 2201. Step 2201: Data Read and Write Program 47 checks whether it is SCSI Read command or not. If it is SCSI Read command, then proceed to Step 2204; otherwise proceed to Step 2202. Step 2202: Data Read and Write Program 47 executes Process to handle write command. Step 2203: Data Read and Write Program 47 sends error to the Host Computer. Step 2204: Data Read and Write Program 47 executes normal SCSI Read operation.

Figure 24:
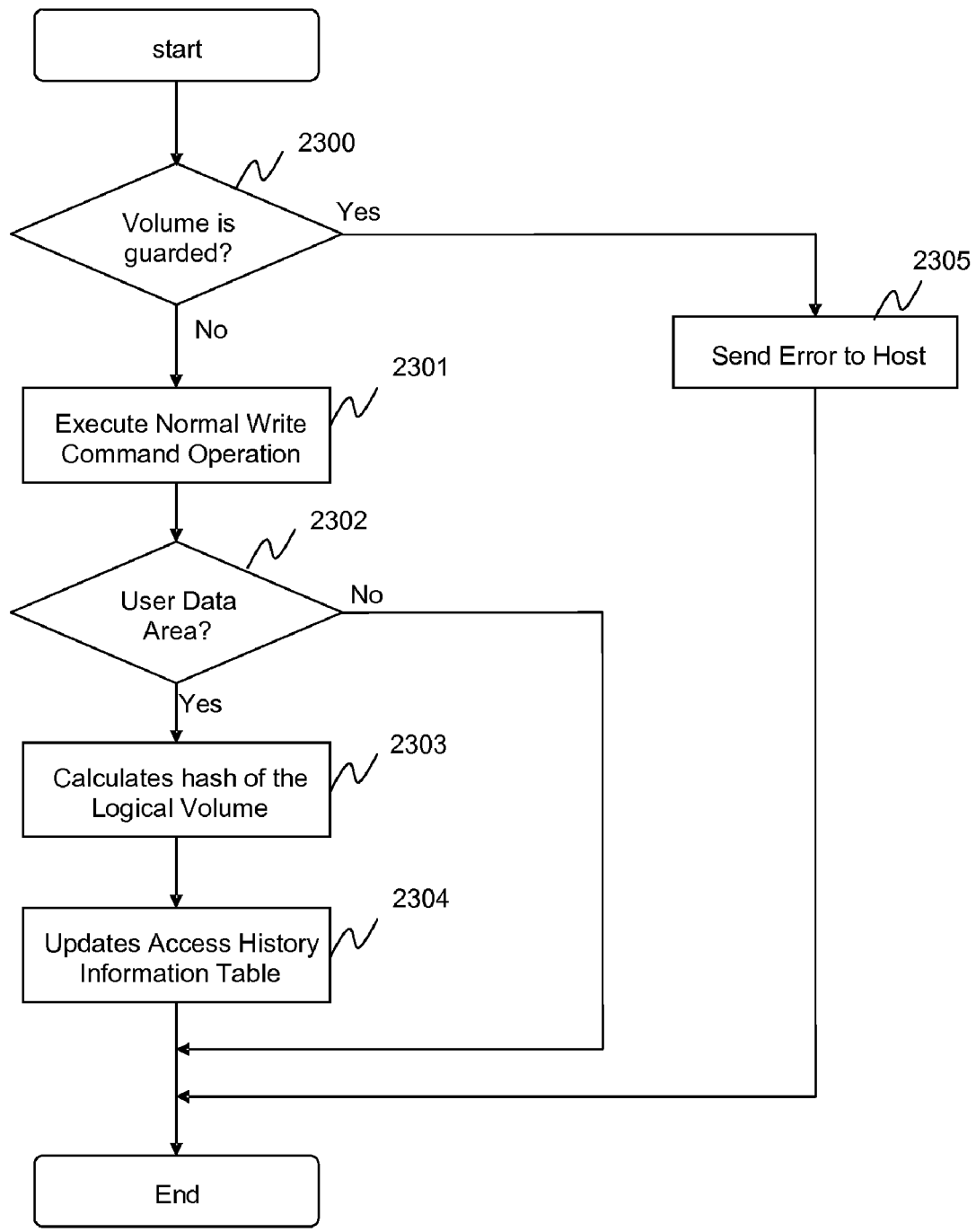
FIG. 24 shows an example process to handle write command.

FIG. 24 shows an example process to handle write command. Step 2300: Data Read and Write Program 47 checks whether the command is issued for the guarded volume or not using Volume Guard Information Table 45. If it is issued for the guarded volume then proceed to Step 2305 otherwise proceed to Step 2301. Step 2301: Data Read and Write Program 47 executes normal SCSI Write operation. Step 2302: Data Read and Write Program 47 checks whether the command is issued for User Data Area or not. If it is issued for User Data Area then proceed to Step 2303 otherwise end the process. Step 2303: Data Read and Write Program 47 calculates a hash value of the Data Area and proceed to Step 2304. Step 2304: Data Read and Write Program 47 updates Access History Information Table 46. Step 2305: Data Read and Write Program 47 sends error to the Host Computer.

Figure 25:
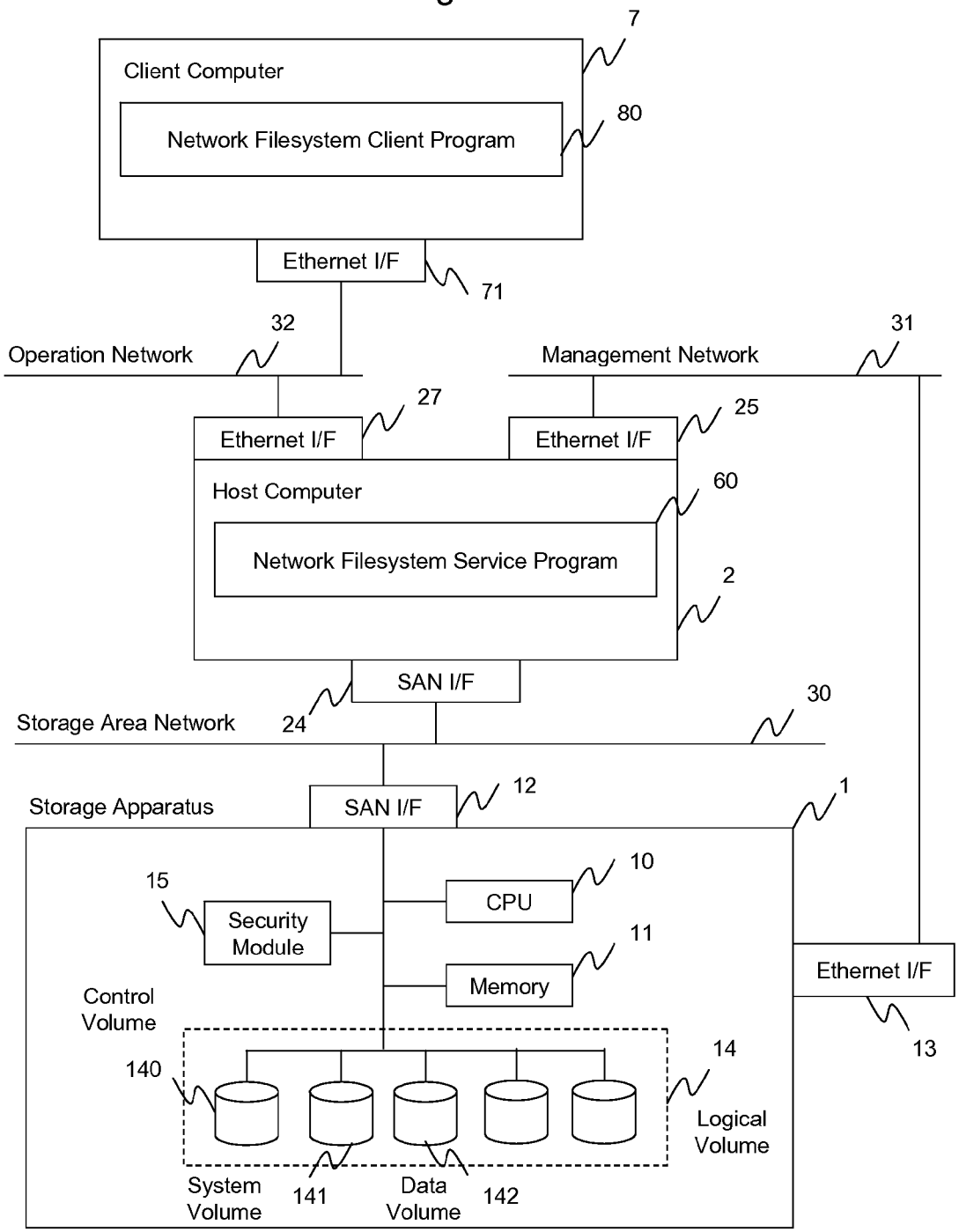
FIG. 25 shows one specific example for a host providing services to client computers.

Host Computer 2 can provide various kinds of services (such as Web services, Mail services, Database, etc., to client computers on Operation Network 32. FIG. 25 shows one specific example. In this example, Host Computer 2 provides Network Filesystem Service such as NFS, CIFS, etc., to Client Computer 7. Network Filesystem Service Program 60 provides Network Filesystem Service to Client Computer 7. For example, it exports part of its own filesystem to Client Computer 7. The Client Computer 7 utilize filesystem that is exported by Network Filesystem Service Program 60 using Network Filesystem Client Program 80.

As can be understood from the above description of embodiments of the invention, this invention provides enhanced security for data residing on volumes of SAN. In general, embodiments of the invention can be thought of as quarantine system, that provides security to quarantined volumes. In general, the inventive method proceeds as follow. When Host Computer is shut down, it locks its assigned logical volume on the Storage System, in cooperation with Storage System. The Storage System records write access history and integrity of logical volumes, and sends the information to Host Computer when it is required to do so. When the Host Computer is started, it unlocks its assigned logical volumes on Storage System, and checks the integrity of the logical volumes, in cooperation with Storage System. If Host Computer finds any violation, it executes security check.

By implementing embodiments of the invention, this invention can provide protection mechanism for logical volume during Host Computer shut down or off line periods. This invention can also provide integrity check mechanism for logical volume when Host Computer is started, so that Host Computer can detect unauthorized access to logical volume during the time it is shut down.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the computerized storage system with data replication functionality. It is intended that the specification and examples be considered as exemplary only, with a true scope and spirit of the invention being indicated by the following claims.

What is claimed is:

1. A method for protecting data stored in a storage system, comprising:
assigning at least one logical volume of the storage system to a host computer;
whenever the host computer initiates a procedure to go off line, sending from the host computer instruction to the storage system to lock the assigned logical volume;
during a time when the host computer remains off line performing:
locking the assigned logical volume by refusing any write request to the assigned volume; and,
storing in the storage system pre-defined access information; and,
when the host resumes operation on line, sending the access information to the host.

2. The method of claim 1, further comprising the step:
calculating a host hash value for selected data of the assigned logical volume, and storing the host hash value locally on the host computer.

3. The method of claim 2, wherein the logical volume comprises system information data and user data, and wherein the selected data comprises user data.

4. The method of claim 3, wherein upon receiving an indication that the host resumes operation, the storage system sends a storage hash value to the host, and the host compares the storage hash value to the host hash value to detect security breach.

5. The method of claim 1, wherein the access information comprises last access time and last access host ID.

6. The method of claim 5, wherein step b further comprises storing in the host a host last access time and a host last access host ID.

7. The method of claim 6, further comprising upon resuming operation by the host, comparing the last access time to the host last access time, and the last access host ID to the host last access host ID to detect security violation.

8. The method of claim 7, wherein upon detecting a security violation, the host computer execute a virus check.

9. The method of claim 1, wherein OS of the host computer resides in the storage system, and wherein step d further comprises:
determining the integrity of the stored OS;
If integrity check is safe, booting the host computer from the stored OS.

10. The method of claim 1, wherein upon receiving a write command to a target volume from a host computer, performing the steps:
  determining whether the target volume is guarded and, if so, returning an error message; otherwise:
  executing the write command and determining whether the target volume is a user data area and, if so, calculating a hash value of the target volume and updating the pre-defined access information.

11. A system enabling protection of data stored in a storage system, comprising:
  A host computer coupled to the storage system, the host computer comprising:
    a processor;
    host memory;
    local volume; and
    a host security module, the security module comprising a volume protection module operable to transmit volume lock instructions to lock a storage assigned volume prior to disconnecting the host computer from the storage system; and,
  a storage system having logical units defined therein, at least one of the logical units comprising the storage assigned volume, the storage system comprising:
    a storage network area interface;
    a controller;
    a memory unit;
    a plurality of physical storage devices; and
    a storage security module, the security module comprising:
      a volume locking module operable to lock the storage assigned volume upon receiving the volume lock instructions from the host security module; and
      access history handling module operable to store in the memory unit pre-defined access information;
  wherein the host computer further comprises volume integrity information table and the storage system further comprises access history information table; and
  wherein the volume integrity information table comprises entry fields for:
    logical unit number;
    last access host ID for host;
    last access host ID for storage;
    last access time for host;
    last access time for storage;
    last hash value for host; and
    last hash value for storage.

12. The system of claim 11, wherein prior to disconnecting from the storage system, the host computer refreshes the values stored in fields: last access host ID for host; last access time for host; and last hash value for host.

13. The system of claim 11, wherein upon resuming connection to the storage system, the host computer obtain values from the storage system for the fields: last access host ID for storage; last access time for storage; and last hash value for storage.

14. The system of claim 11, wherein the storage system further comprises access history information table comprising entries for:
  logical unit number;
  hash value;
  access host ID; and
  access time.

* * * * *